United States Patent

Nouvet et al.

(10) Patent No.: US 6,647,439 B1
(45) Date of Patent: Nov. 11, 2003

(54) ARRANGEMENT WITH A PLURALITY OF PROCESSORS SHARING A COLLECTIVE MEMORY

(75) Inventors: Thierry Nouvet, Caen (FR); Hugues De Perthuis, Garcelles (FR); Stéphane Mutz, Caen (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 491 days.

(21) Appl. No.: 09/640,732

(22) Filed: Aug. 17, 2000

(30) Foreign Application Priority Data

Aug. 31, 1999 (FR) .............................................. 99 10954

(51) Int. Cl.[7] .............................................. G06F 13/28
(52) U.S. Cl. ........................ 710/27; 710/35; 710/112; 711/145; 712/225
(58) Field of Search ................ 710/3, 13, 20, 710/23, 27, 33, 52–57, 4, 11, 35, 74, 112, 126; 711/100, 145, 147, 206, 151; 712/225

(56) References Cited

U.S. PATENT DOCUMENTS

| | | | | |
|---|---|---|---|---|
| 5,072,420 A | | 12/1991 | Conley et al. ............... 395/425 |
| 5,287,480 A | * | 2/1994 | Wahr ............................ 395/425 |
| 5,293,621 A | * | 3/1994 | White et al. ................. 395/650 |
| 5,448,264 A | * | 9/1995 | Pinedo et al. ................ 345/201 |
| 5,485,586 A | * | 1/1996 | Brash et al. ................. 710/112 |
| 5,838,931 A | * | 11/1998 | Regenold et al. ........... 710/128 |
| 5,873,119 A | * | 2/1999 | Khandekar et al. ......... 711/169 |
| 6,314,500 B1 | * | 11/2001 | Rose ............................ 711/148 |
| 6,446,169 B1 | * | 9/2002 | Pawlowski ................... 711/131 |
| 6,470,436 B1 | * | 10/2002 | Croft et al. .................. 711/206 |

FOREIGN PATENT DOCUMENTS

WO 9532578 A2 11/1995

* cited by examiner

Primary Examiner—Kim Huynh
Assistant Examiner—Rijue Mai
(74) Attorney, Agent, or Firm—Steven R. Biren

(57) ABSTRACT

A data processing arrangement comprises a plurality of processors. These processors share a collective memory. The arrangement comprises private buses. A private bus enables data communication exclusively between a processor and the collective memory. A memory interface provides access to the collective memory in data bursts while it produces substantially steady data streams on the private buses.

5 Claims, 8 Drawing Sheets

ARRANGEMENT WITH A PLURALITY OF PROCESSORS SHARING A COLLECTIVE MEMORY

BACKGROUND OF THE INVENTION

The invention relates to a data processing arrangement comprising a plurality of processors which share a collective memory. The invention may be applied in, for example, an integrated circuit capable of decoding an MPEG data stream.

DESCRIPTION OF THE PRIOR ART

The document WO 95/32578 describes an MPEG decoder. The MPEG decoder has an external DRAM memory. A control unit controls the external DRAM memory and an internal bidirectional bus. All the data transfers between the external DRAM memory and the various internal units proceed via this bus.

SUMMARY OF THE INVENTION

It is an object of the invention is to enable implementations to be realized at comparatively low cost, particularly implementations for high-speed processing.

The invention takes into account the following aspects. Data communication between a processor and a memory is generally effected via a bus. In order to accomplish said communication, the bus should have a certain pass band in terms of number of bits per unit of time. The speed with which the processor accepts and supplies data, respectively when data is read out of or written into the memory, is governed by the required pass band. For example, a processor which processes video data in real time requires a bus having a comparatively large pass band.

In principle, the pass band of a bus depends on two factors. First of all, the pass band depends on the electrical characteristics of the lines forming the bus. For example, if a line has a substantial capacitance, this line can only transfer a comparatively small number of bits per unit of time. Secondly, the pass band depends on the number of lines forming the bus. For example, if a line can transfer 1 Mbit per second at the most, a bus comprising 10 lines (width=10 bits) will have a pass band of 10 Mbits per second. A bus comprising 100 lines (width=100 bits) will have a pass band of 100 Mbits per second.

A customary scheme is to use a collective bus via which different processors can access a collective memory. The prior-art document describes an example of this. Since the collective bus connects different processors to the collective memory it will generally have a substantial length. This means that the lines of this bus will have comparatively high capacitances. Therefore, in order to obtain an adequate pass band, the bus should have a comparatively large size, particularly for high-speed uses, as for example, video processing. A large-size bus is generally expensive, particularly in integrated circuit implementations because the bus occupies a comparatively large surface area.

According to the invention, an arrangement of the type defined in the opening paragraph comprises:

private buses, a private bus enabling data communication exclusively between a processor and the collective memory; and a memory interface for maintaining a substantially steady data stream via the private buses, the collective memory being accessed in bursts.

This enables the width of each private bus to be optimized: the width of a private bus is such that the pass band suffices exactly for the relevant processor. The pass bands of the private buses will be utilized effectively because the memory interface ensures that these buses convey substantially steady data streams. Moreover, since a private bus needs to connect only a single processor to the collective memory, the bus will be comparatively short. Consequently, one line of the bus can transfer a comparatively large number of bits per unit of time. As a result of all these factors it is achieved that in a large number of implementations the private buses together will occupy less surface area than a collective bus as used in the prior art. Thus, the invention enables implementations to be realized at comparatively low cost.

The invention and additional features, which can be used advantageously for putting the invention into effect, will be described in greater detail hereinafter with reference to the drawings.

DESCRIPTION OF THE PREFERRED EMBODIMENTS

The following remarks relate to the reference signs. Similar entities bear identical reference letters in all the Figures. A plurality of similar entities may appear in a single Figure. In that case a numeral is suffixed to the reference letters in order to distinguish between similar entities. The numeral or suffix may be omitted for convenience. This applies both to the description and to the claims.

Figure 1:
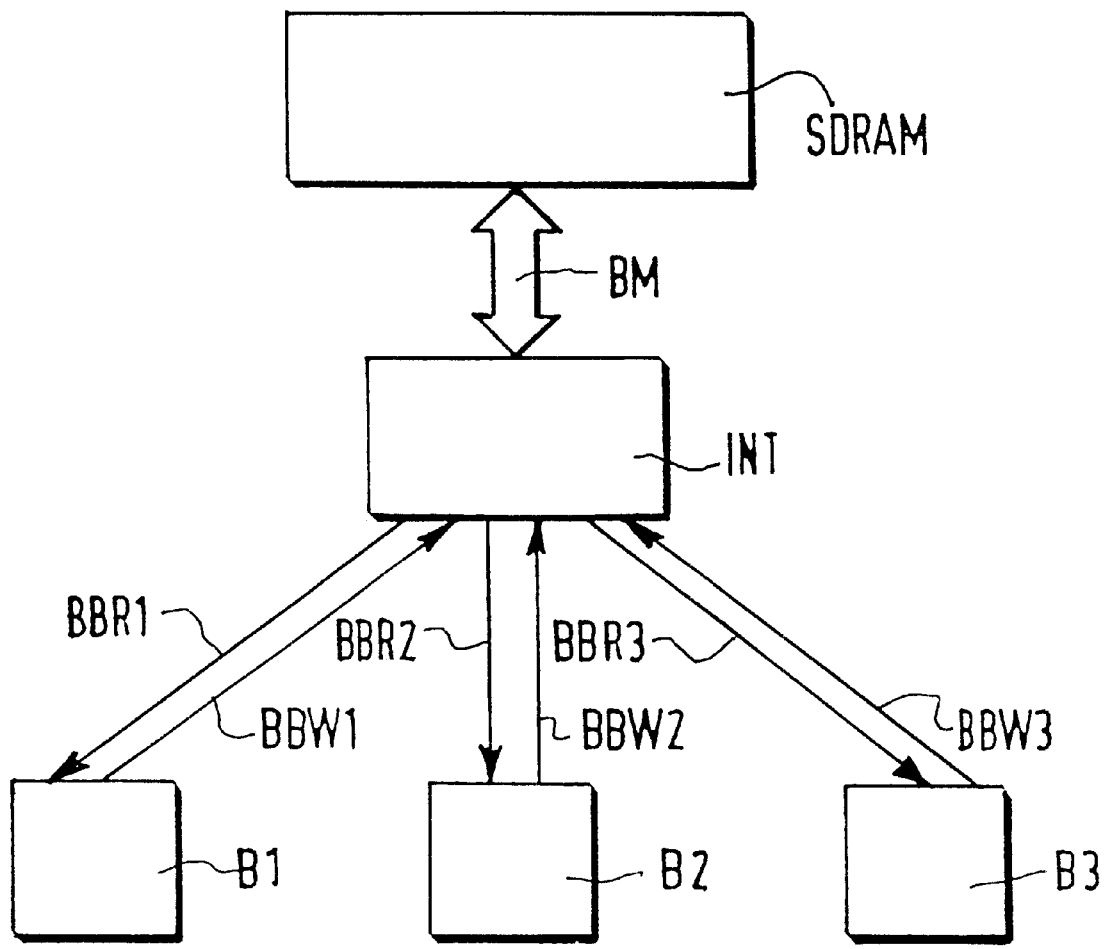
FIG. 1 shows a data processing arrangement in accordance with the invention.

FIG. 1 shows a data processing arrangement. The arrangement comprises a collective memory SDRAM, a memory interface INT, and three data processing units B1, B2 and B3. These data processing units will be referred to hereinafter as "units". Each unit B is connected to the memory interface INT via a private read bus BBR and a private write bus BBW. Each private read bus BBR and each private write bus BBW is dedicated to a given unit B. The memory interface INT is connected to the collective memory SDRAM via a collective bus BM. The units B, the private read and write buses BBR, BBW and the memory interface INT may form part of a single integrated circuit whereas the collective memory SDRAM is an external device.

The general operation of the data processing arrangement is as follows. On request the units B receive data to be processed, stored in the collective memory SDRAM. After having processed said data the units B apply the processed data to the collective memory SDRAM via the memory interface INT. The memory interface INT controls the access to the collective memory SDRAM by the various units B.

The memory interface INT has two basic functions. First of all, it performs an arbitration between the various units B at the level of access to the collective memory SDRAM. A single unit B can access the collective memory SDRAM either for reading or writing at one time. This means that a unit B can access the memory only in a burst mode. Secondly, in the case of reading, the memory interface INT transforms the data bursts coming from the collective memory SDRAM and intended for a given unit B into a substantially steady data stream. This data stream is thus transferred to the unit B via the respective private read bus BBR. In the case of writing the memory interface INT transforms a substantially steady data stream coming from a given unit B into data bursts to be written into the collective memory SDRAM.

Figure 2:
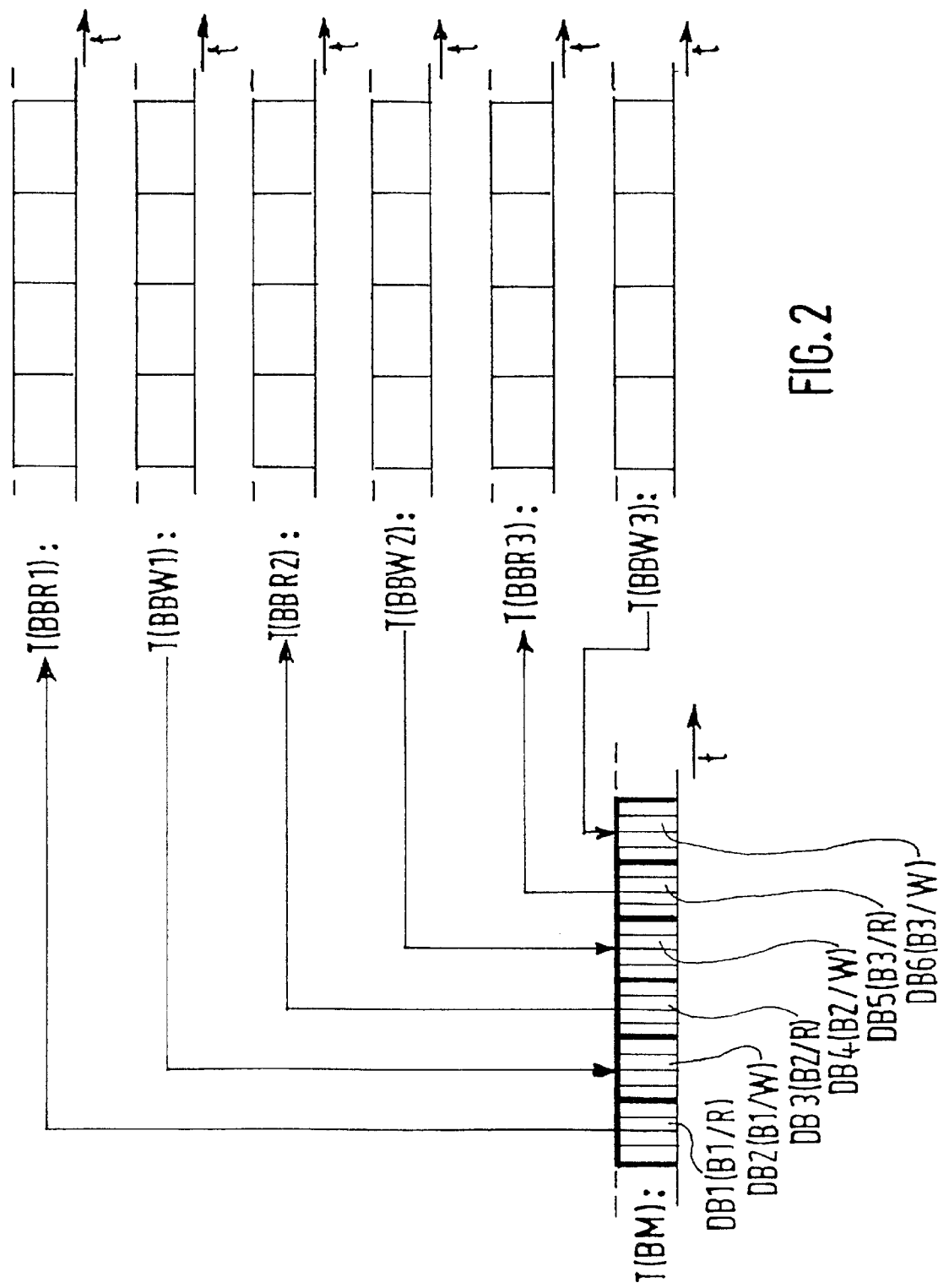
FIG. 2 illustrates the operation of the memory interface of the arrangement.

FIG. 2 illustrates the operation of the memory interface INT. T(BM) represents a data transfer between the collective memory SDRAM and the memory interface INT via the collective bus BM. T(BBR1), T(BBR2) and T(BBR3) represent data transfers between the memory interface INT and the units B1, B2 and B3, respectively, via the respective private read buses BBR1, BBR2 and BBR3. T(BBW1), T(BBW2) and T(BBW3) represent data transfers between the memory interface INT and the units B1, B2 and B3, respectively, via the respective private write buses BBW1, BBW2 and BBW3.

The data transfer T(BM) consists of data bursts DB. Each data burst DB corresponds to one access operation of the collective memory SDRAM by a unit B either in the write mode or in the read mode. The parenthesized references following DB indicate to which unit B the data in the burst belong and also indicate the type of access: write (W) or read (R). For example, DB1 (B1/R) indicates that the data burst DB1 concerns an access to the collective memory SDRAM in the read mode by B1.

FIG. 2 shows that the memory interface INT performs a "smoothing" of the data bursts coming from the collective memory SDRAM and belonging to a certain unit B. This Figure also shows that, conversely, the memory interface INT performs a time concentration of the data received from a unit B in order to write said data into the collective memory SDRAM as a burst (data compression). Thus, the transfers of data via the private read buses BBR and the private write buses BBW are effected at comparatively low rates. Consequently, this makes it possible for the private read buses BBR and the private write buses BBW to have comparatively narrow pass bands and, as a result, to have a comparatively small width. In this respect it is to be noted that the size of a bus need not necessarily correspond to the number of bits contained in the data transferred by this bus. For example, 16 bit data can be split into 4 bit words. Thus, said data can be transferred via a 4-bit bus in the form of a sequence of 4 words.

Figure 3:
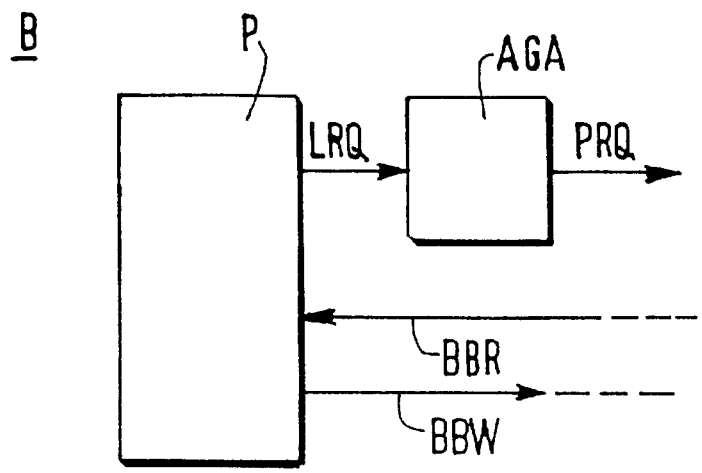
FIG. 3 shows a data processing unit of the arrangement.

FIG. 3 shows a unit B. The unit B comprises a processor P and a general addressing circuit AGA. The processor P makes logic requests LRQ. It is assumed that the unit B processes video data, in which case a logic request LRQ may be, for example, a request for pixels of a given line in the current image. The general addressing circuit AGA transforms the logic request LRQ into a physical request PRQ. The physical request PRQ defines the physical addresses where the requested data is stored in the collective memory SDRAM. The physical requests PRQ may have the following form: a start address, a number of addresses to be searched starting from said address and, if applicable, a scheme to be employed during the search for data. This schema may be defined in the form of: the number of consecutive addresses to be read, the number of addresses to be jumped and the number of "read and jump" iterations. The AGA may be programmable in such a manner that translation parameters define the translations of logic requests LRQ into physical requests PRQ. This enables a flexible storage of data into the collective memory SDRAM.

Figure 4:
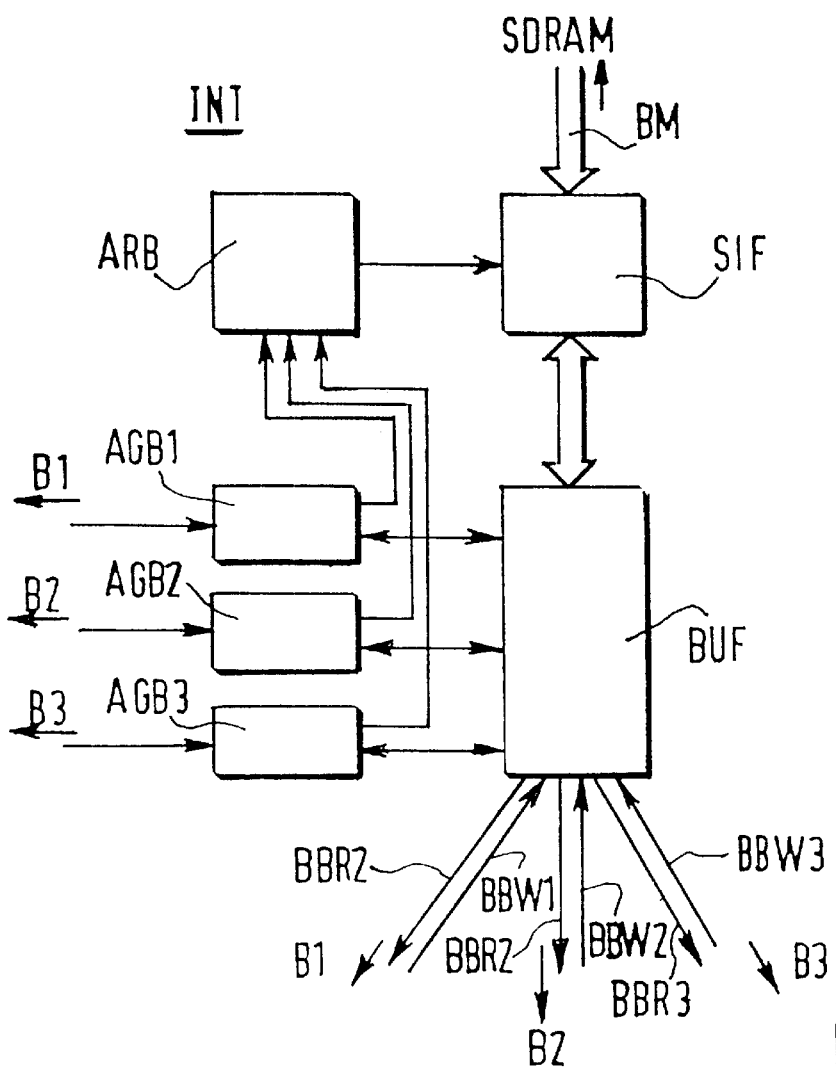
FIG. 4 shows the memory interface of the arrangement.

FIG. 4 shows the memory interface INT. The memory interface INT comprises an arbiter ARB, an access interface SIF, a buffer memory arrangement BUF and addressing and macro-command circuits AGB. There is an addressing and macro-command circuit AGB for each unit B.

On the whole, the internal operation of the memory interface INT is as follows. Each addressing and macro-command circuit AGB divides a physical request from the unit B with which it is associated into macro-commands. A macro-command represents a request for access to a given row in the memory. Before a macro-command is submitted to the arbiter ARB the addressing and macro-command circuit AGB verifies whether there is enough room in the buffer memory arrangement BUF. To this end, it first applies the macro-command to the buffer memory arrangement BUF. If the buffer memory arrangement BUF confirms that there is room for the storage of the number of data defined by the macro-command, the addressing and macro-command circuit AGB submits the macro-command to the arbiter ARB. The arbiter ARB receives the macro-commands from the various addressing and macro-command circuits AGB and selects a macro-command to be applied to the access interface SIF. This selection is made in accordance with an arbitration scheme described hereinafter. The access interface SIF processes the macro-commands received from the arbiter ARB in the order of their receipt. Thus, the access interface SIF provides the access to the collective memory SDRAM, the access operations being defined by the macro-command being processed.

A macro-command enables X groups of addresses to be accessed, each group comprising Y addresses, the groups of addresses being separated from one another by Z words, X, Y and Z being integers. Thus, a macro-command contains the following information:

first address to be accessed;
number of addresses to be accessed following upon the first address in a group of addresses (Y−1);
number of addresses to be skipped between two groups of consecutive addresses (Z);
number of address groups to be accessed in addition to the first group (X−1);
type of access: read or write.

An example of a macro-command at bit level is as follows. It is assumed that the data stored in the collective memory SDRAM has a width of 32 bits and the collective memory SDRAM has a maximum capacity of 256 Mbits. This means that an address is expressed as 23 bits. It is further assumed that the access operations are limited to a maximum size of 16 addresses. Such a limit is preferred in view of latency. Thus, X−1 and Y−1 are 15 at the most and can consequently be coded in 4 bits. Finally, a row contains a maximum of 512 addresses in accordance with the configuration of the collective memory SDRAM. Consequently, the number of addresses to be jumped cannot exceed 511 and, as a result, this number can be coded in 9 bits. The macro-commands thus have a size of 23+2×4+9+1=41 bits. The address can be coded in the bits 40 to 18, the access type in the bit 17, the number of words to be read (Y−1) in the bits 16 to 13, the number of words to be jumped (Z) in the bits 12 to 4, and the number of word groups (X−1) in the bits 3 to 0.

Figure 5:
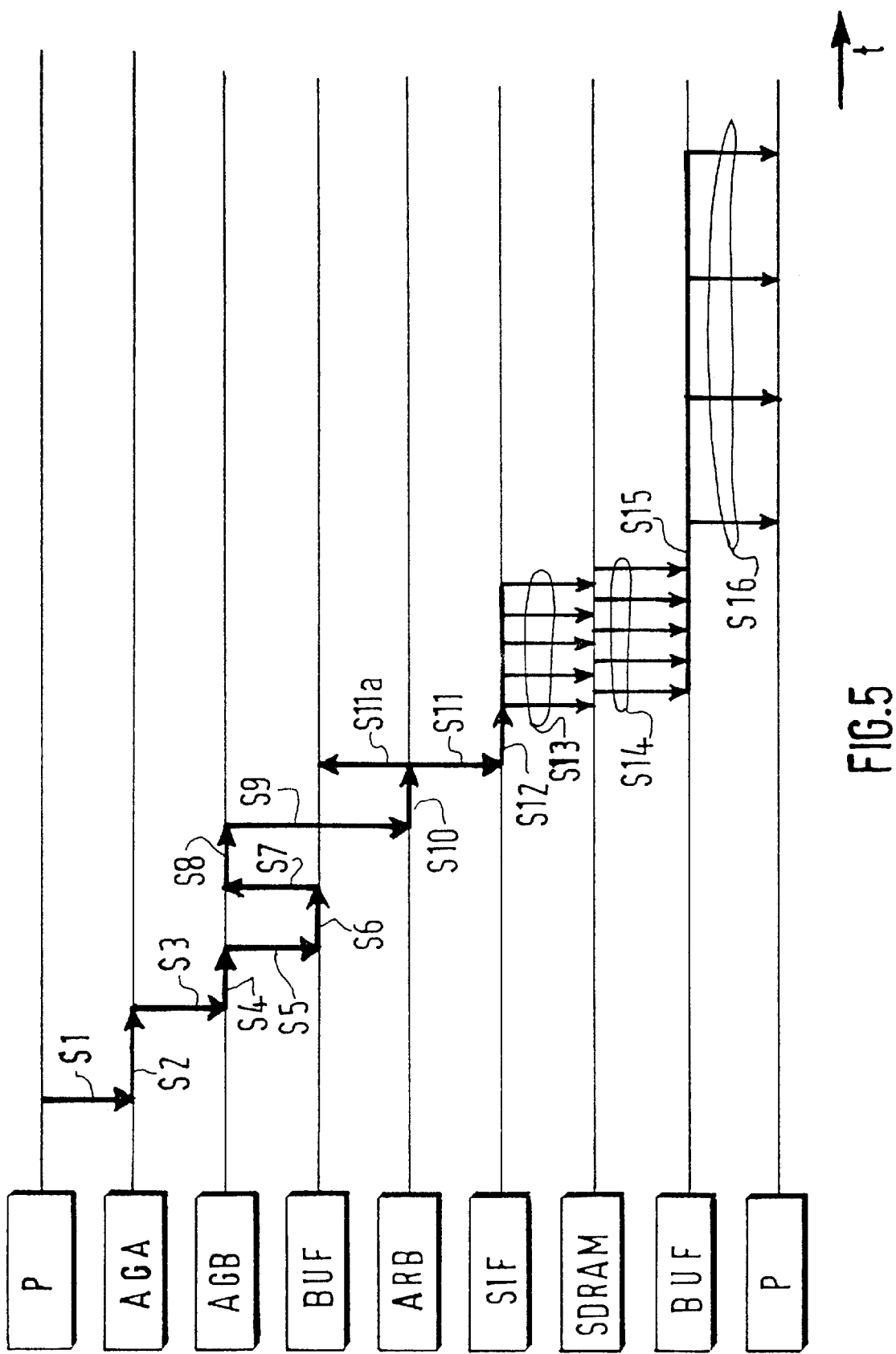
FIG. 5 illustrates a read access to a unit.

FIG. 5 illustrates a process of access to the collective memory SDRAM in the read mode by a given unit B. The horizontal dimension represents the time. The vertical dimension of this diagram represents the different functional elements which are involved. The diagram contains arrows. These arrows represents various steps S in the process of access to the interface memory SRAM.

S1=The processor P of the relevant unit B submits a logic request LRQ to the general addressing circuit AGA. The logic request LRQ specifies a data sub-set, for example the luminance pixels of a line in a set of data to be processed, for example an image.

S2=The general addressing circuit AGA transforms the logic request LRQ into a physical request PRQ.

S3=The general addressing circuit AGA submits the physical request PRQ to the macro-commands addressing circuit AGB.

S4=The macro-command addressing circuit AGB transforms the physical request PRQ into macro-commands.

S5=The macro-command addressing circuit AGB submits the first one of the macro-commands derived from the physical request PRQ to the buffer memory arrangement BUF.

S6=The buffer memory arrangement BUF verifies whether there is room for the storage of the number of data specified by the macro-command.

S7=The buffer memory arrangement BUF sends an acknowledgement to the macro-command addressing circuit AGB that there is room.

S8=Represents a given delay.

S9=The macro-command addressing circuit AGB submits the macro-command to the arbiter ARB. S10=The arbiter ARB processes the macro-command as a request for access to the collective memory SDRAM in accordance with an arbitration schema which applies to any access to the collective memory SDRAM by the units (in the read and in the write mode).

S11=The arbiter ARB submits the macro-command to the access interface SIF.

S11a=The arbiter ARB sends an acknowledgement to the buffer memory arrangement BUF that the macro-command has been submitted to the access interface SIF.

S12=The macro-command is queued in the access interface SIF, which first processes the previously received macro-commands.

S13=The access interface SIF generates control signals for the collective memory SDRAM on the basis of the macro-command. These control signals cause the data at the addresses specified by the macro-command to be read successively.

S14=The data successively read from the collective memory SDRAM is transferred to the buffer memory arrangement BUF.

S15=The buffer memory arrangement BUF temporarily stores the data.

S16=The buffer memory arrangement BUF transfers the data to the processor P in a substantially steady manner.

The steps S5–S15 are repeated for each macro-command following the logic request LRQ made in the step S1.

The next steps are not shown in FIG. 5. Upon the step S1, the general addressing circuit AGA sends an acknowledge signal to the processor P. This signal indicates that the logic request LRQ has been accepted and will be processed. In response to the acknowledge signal, the processor P makes a new logic request and holds it till further notice. When the macro-command addressing circuit AGB submits the last macro-command in response to the logic request LRQ the processing of the logic request LRQ is finished. In that case the macro-command addressing circuit AGB sends an acknowledge signal to the general addressing circuit AGA to indicate to the latter that the processing of the logic request LRQ has been completed. In response thereto, the general addressing circuit AGA starts the processing of the new logic request LRQ in a manner similar to the processing of the logic request LRQ effected in the step S1. In other words, the process is repeated.

Figure 6A:
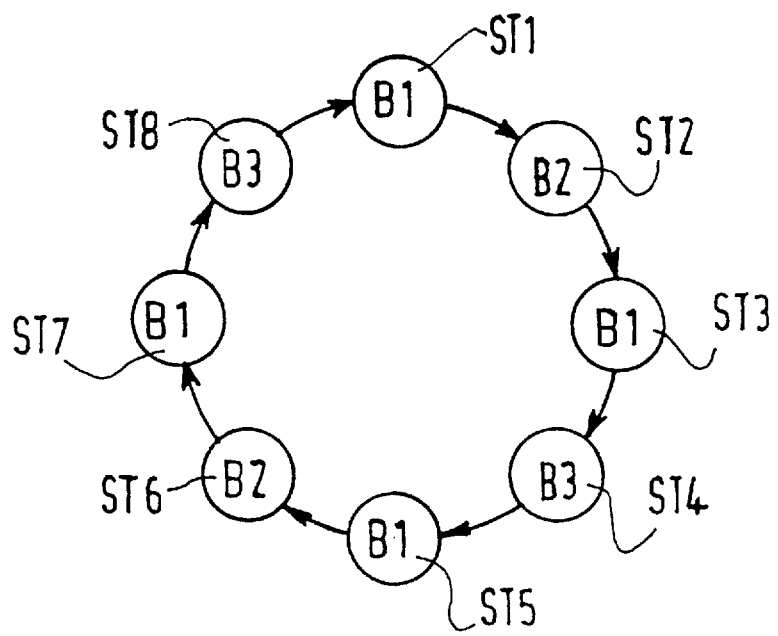
FIGS. 6a and 6b illustrate an arbitration access to a collective memory.
Figure 6B:
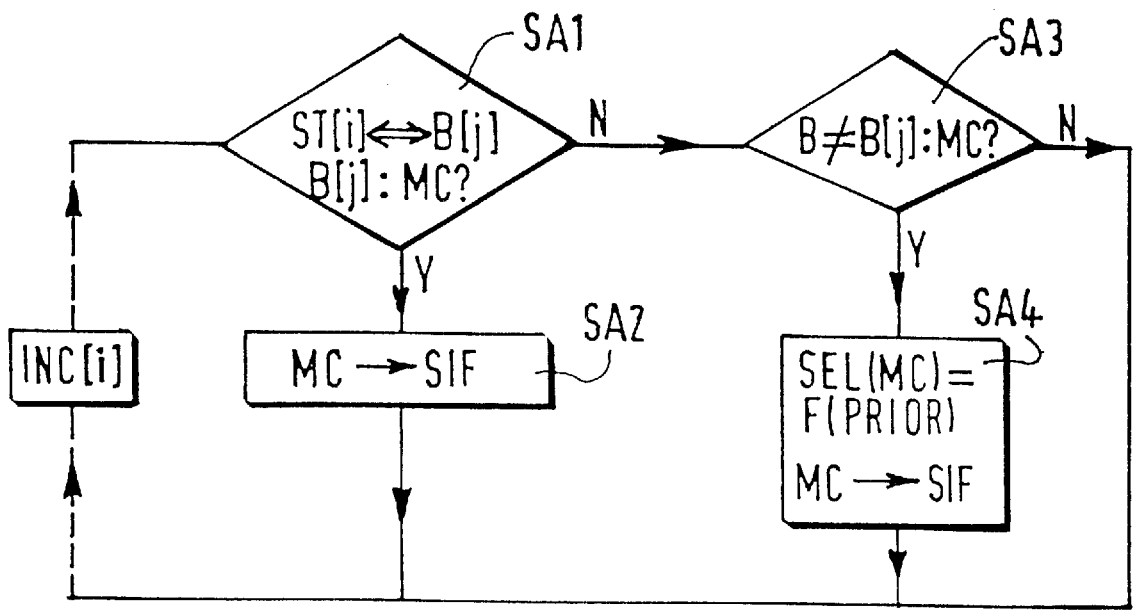

FIGS. 6a and 6b show an arbitration scheme for the arbiter ARB. In FIG. 6a eight states ST1–ST8 are shown as circles. These states ST occur one after the other and in a cyclic fashion. Each state ST represents a possibility of sending a macro-command to the access interface SIF. Thus, each state represents a possibility of accessing a memory. Each state corresponds to a given processor P. The processor P to which a given state corresponds is specified in the circle representing the state.

FIG. 6b represents the arbitration process corresponding to FIG. 6a. This process comprises a plurality of steps SA1–SA8 and is carried out for each state ST in FIG. 6a. The step SA1 is the first step carried out after a jump of state. In the step SA1, the arbiter ARB verifies if a macro-command, submitted by the macro-command addressing circuit AGB and following a logic request LRQ from the processor P[j] to which the state S[i] corresponds, is pending. If such a macro-command is pending the step SA1 is followed by the step SA2. In the step SA2, the arbiter ARB sends the relevant macro-command to the access interface SIF. The effect of this is that after a given delay the collective memory SDRAM will be accessed by the relevant processor P as defined by the macro-command. After the macro-command has been sent the arbiter jumps to the next state, which means that the process represented in FIG. 6b is repeated.

However, if in the step S1 the arbiter ARB has detected that there is no pending macro-command associated with the processor P to which the state S[i] corresponds, the step SA1 is followed by the step SA3. In the step SA3, the arbiter ARB verifies if other macro-commands are waiting. If there are no other macro-commands waiting, the arbiter ARB jumps to the next state and the process shown in FIG. 6b is repeated. If there are other macro-commands waiting the arbiter ARB performs the step SA4. In the step SA4, the arbiter ARB selects a macro-command in an order of priority. Each macro-command has a given level of priority. The priority level is determined by the processor P from which the macro-command originates. The arbiter ARB thus selects the macro-command having the highest priority level and sends this macro-command to the access interface SIF. After having sent the macro-command the ARB jumps to the next state, which means that the process shown in FIG. 6b is repeated.

With regard to FIGS. 6a and 6b it is to be noted that it is not necessary that each state corresponds to a processor P. It is possible to introduce one or more states which do not correspond to any processor P, which means that it is possible to introduce free states. In the case of a free state, the arbiter ARB selects a macro-command only on the basis of the priority order. Such a free state can be useful in the case that the data processing arrangement includes a processor P whose restraints in terms of latency time and pass band at the level of access to the collective memory SDRAM are comparatively moderate. Thus, in order to avoid that this processor P is not given enough access, free states could be introduced. The processor P can take advantage of these free states to access the collective memory SDRAM.

Figure 7:
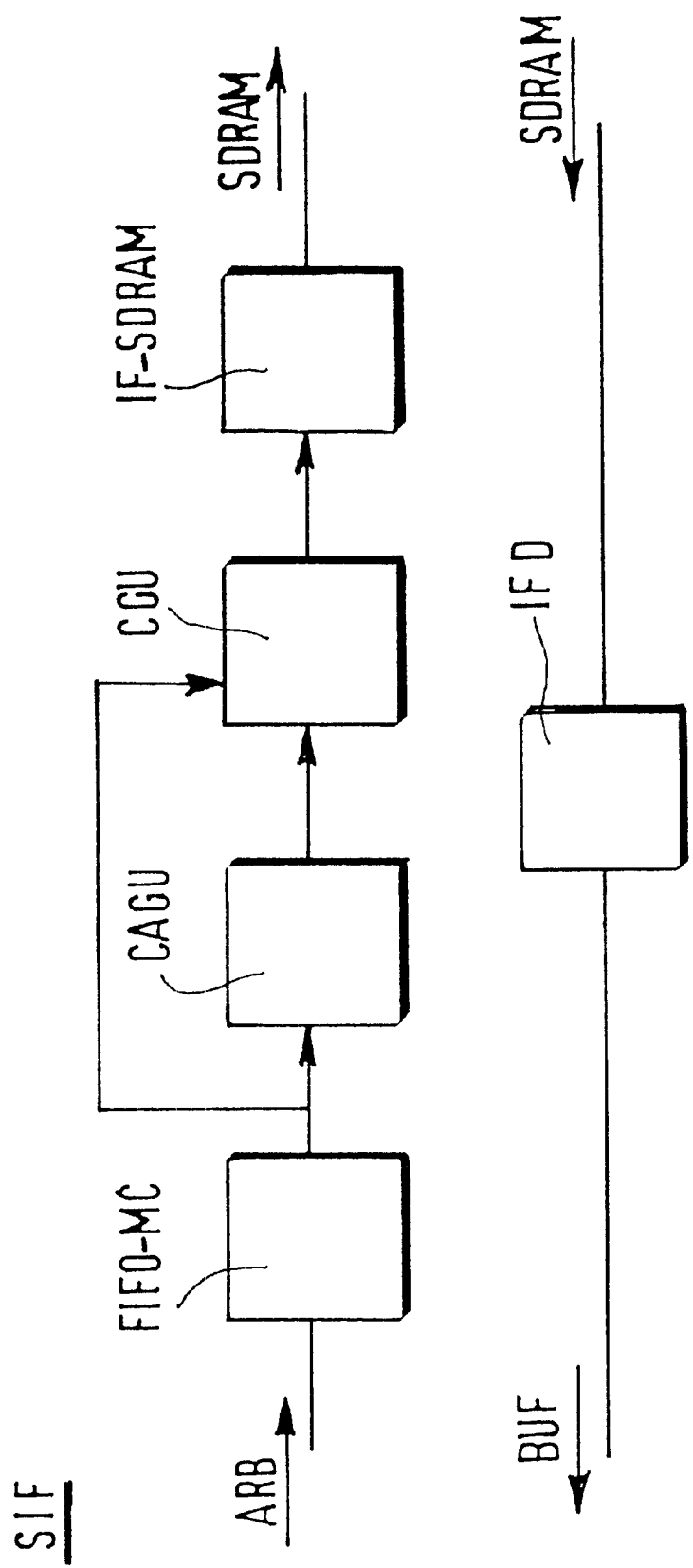
FIG. 7 show an access interface of the memory interface.

FIG. 7 shows an example of the access interface SIF. The access interface SIF comprises a macro-command buffer memory FIFO_MC, a column generator CAGU, a command generator CGU, a control signal generator IF_SDRAM, a data buffer memory IF_D.

The general operation of the access interface SIF is as follows. The macro-command buffer memory FIFO_MC receives the macro-commands from the arbiter ARB. This memory temporarily stores these macro-commands and sends them to the column generator CAGU in the order of their arrival. In the case that the macro-command buffer memory FIFO_MC is full and therefore cannot accept a new macro-command, it reports this to the arbiter ARB. As a result of this signal from the access interface SIF, which indicates that its "FIFO is full", the arbiter ARB postpones the transfer of the currently selected macro-command until the instant at which the macro-command buffer memory FIFO_MC reports that it can accept a new macro-command. In fact, the "FIFO is full" signal from the access interface SIF "freezes" the arbiter ARB for a certain time.

The column generator CAGU requests a new macro-command from the macro-command buffer memory FIFO_MC when the memory access operations in accordance with the preceding macro-command have been carried out. As a matter of fact, the column generator CAGU in combination with the command generator CGU translate the macro-command into a series of addresses. An address of the collective memory SDRAM is defined by the number of a bank of the collective memory SDRAM, the number of a row and the number of a column. It has already been stated that a macro-command relates to an access to a single row of the interface memory SRAM, which automatically implies that the access takes place in a single bank. Therefore, it suffices that the column generator CAGU generates a series of columns on the basis of the macro-command in order to define a series of addresses in accordance with the macro-command. An implementation of the column generator CAGU may comprise, for example, some counters and some logic circuits. In such an implementation the content of a macro-command serves to program the counters.

The command generator CGU successively receives another column number of the collective memory SDRAM. The command generator CGU further receives from the macro-command buffer memory FIFO_MC the bank number and the row number of the addresses as defined by the macro-command. This information enables the column generator CAGU to define a series of commands for access to the collective memory SDRAM, each command defining a single address. Moreover, the command generator CGU generates commands necessary for setting the collective memory SDRAM to a correct state so as to allow the access operations as defined by the macro-commands. These commands relate to the appropriate processes for the collective memory SDRAM, such as preloading and activation. Furthermore, the command generator CGU ensures that the collective memory SDRAM is refreshed at regular intervals and generates the commands necessary to perform these refresh operations.

The control signal generator IF_SDRAM generates control signals on the basis of the commands received from the command generator CGU. For example, the control signal generator IF_SDRAM generates signals referred to by the acronyms RAS, CAS. The control signal generator IF_SDRAM ensures that in a series of control signals certain waiting times for the collective memory SDRAM are observed. These waiting times may vary depending on the type of collective memory SDRAM that is used. Consequently, the control signal generator IF_SDRAM is specific to the type of collective memory SDRAM that is used. If a collective memory SDRAM of another type is to be used it is sufficient to modify, i.e. reprogram, the control signal generator IF_SDRAM. In principle, the other elements of the access interface do not require any modifications.

The data buffer memory IF_D serves to transfer the data from the collective memory SDRAM to the buffer memory shown in FIG. 4 in the case of reading and to transfer the data from the buffer memory BUF to the collective memory SDRAM in the case of writing. For this purpose, the data buffer memory IF_D synchronizes the data supplied by the collective memory SDRAM (reading) or applied to the collective memory SDRAM (writing). Moreover, the data buffer memory IF_D forms a FIFO having a unit depth. This means that if a given clock pulse causes data to be read from the collective memory SDRAM, this data will be transferred to the buffer memory arrangement BUF on the next clock pulse. In the case of writing this is the other way round.

Figure 8:
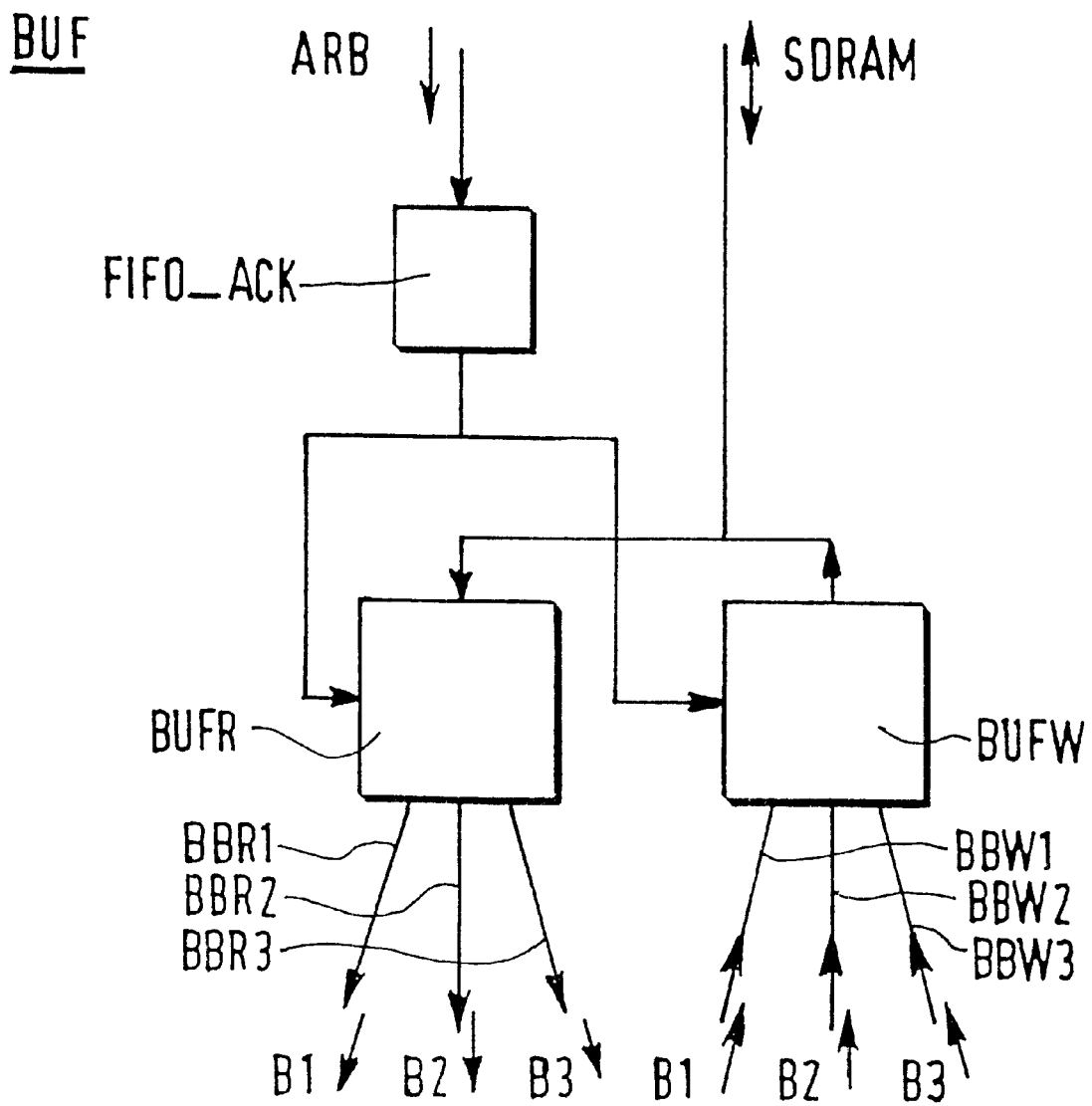
FIG. 8 shows a buffer memory arrangement of the memory interface.

FIG. 8 shows an example of the buffer memory arrangement BUF which forms part of the memory interface INT shown in FIG. 4. The buffer memory arrangement BUF comprises a read buffer memory arrangement BUFR as well as a write buffer memory arrangement BUFW and a buffer memory for acknowledge signals FIFO_ACK. The read buffer memory arrangement BUFR and the write buffer memory arrangement BUFW are connected to the collective memory SDRAM via the access interface SIF and the collective bus BM as is shown in FIG. 1. The read buffer memory arrangement BUFR is connected to the units B1, B2 and B3 via the private read buses BBR1, BBR2 and BBR3, respectively. The write buffer memory arrangement BUFW is connected to the units B1,B3 and B3 via the private write buses BBW1, BBW2 and BBW3, respectively. The acknowledge signal buffer memory FIFO_ACK is connected to the arbiter ARB.

The general operation of the buffer memory arrangement BUF is as follows. The read buffer memory arrangement BUFR temporarily stores the data received from the collective memory SDRAM, while the write buffer memory arrangement BUFW stores the data to be written into the collective memory SDRAM and received from the different units B. The acknowledge signal buffer memory FIFO_ACK receives the acknowledge signals coming from the arbiter ARB. Such a signal indicates that the arbiter ARB has applied a macro-command to the access interface SIF.

The acknowledge signal buffer memory FIFO_ACK has the same depth as the macro-command buffer memory FIFO_MC of the access interface SIF shown in FIG. 7. Consequently, when a macro-command leaves the macro-command buffer memory FIFO_MC, as a result of which a memory access in accordance with the macro-command is effected, the acknowledge signal corresponding to this macro-command leaves the acknowledge signal buffer memory FIFO_ACK. This signal indicates whether the relevant access operation is a read access or a write access. In the first-mentioned case, the read buffer memory arrangement BUFR is activated to receive data from the collective memory SDRAM, while in the last-mentioned case the write buffer memory arrangement BUFW is activated to send data to the collective memory SDRAM. The acknowledge signal supplied by the acknowledge signal buffer memory FIFO_ACK further indicates the number of data involved in the access operation as defined by the macro-command. This indication is used by the buffer memory arrangement BUF for the internal management of "where to store the data or where to fetch the data?" in the case of reading or writing, respectively.

Figure 9:
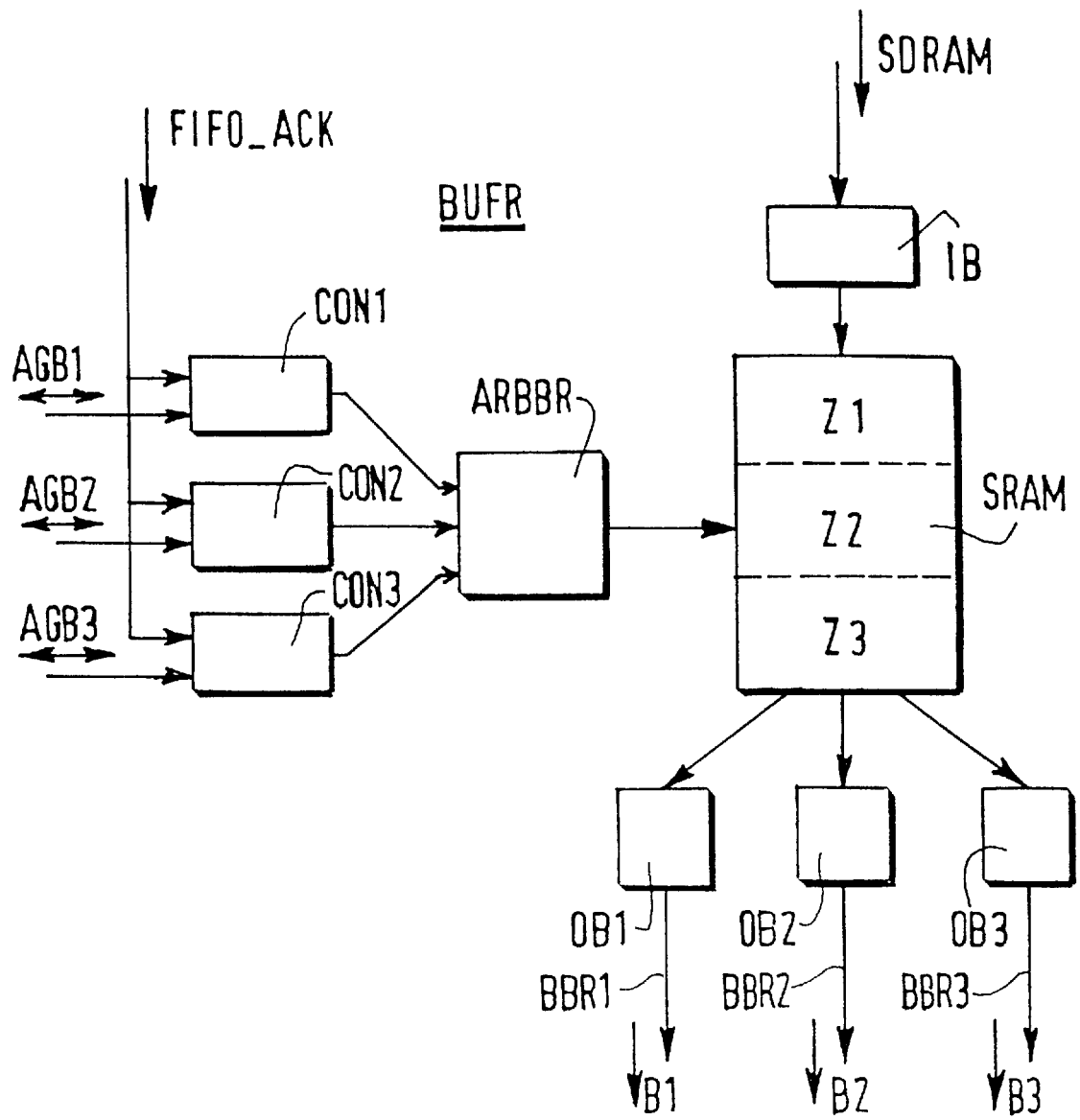
FIG. 9 shows a buffer memory arrangement for reading.

FIG. 9 shows an example of the read buffer memory arrangement BUFR. The read buffer memory arrangement BUFR comprises an input buffer memory IB, an interface memory SRAM, an arrangement comprising a plurality of output buffer memories OB, an arrangement of control circuits CON, and an interface memory access arbiter ARBBR. The input buffer memory IB is connected to the collective memory SDRAM via the access interface SIF already shown in FIG. 4. The output buffer memories OB1, OB2 and OB3 are connected to processors P1, P2 and P3 via the private read buses BBR1, BBR2 and BBR3, respectively, the last-mentioned elements being shown in FIGS. 2 and 3. The control circuits CON1, CON2 and CON3 are connected to the macro-command addressing circuit AGB1, the macro-command addressing circuit AGB2 and the macro-command addressing circuit AGB3, respectively, as well as to the access interface SIF.

The read buffer memory arrangement BUFR operates as follows. The data received from the collective memory SDRAM has a width of N bits, N being an integer, and arrive with a frequency F. The interface memory SRAM has a width of 2N bits, which means that an address can contain 2N bits, and operates at the frequency F. The input buffer memory IB forms pairs of two consecutive data coming from the collective memory SDRAM and loads these pairs into the interface memory SRAM. It takes two clock cycles to form one pair. When it is assumed that all the successive data received from the collective memory SDRAM can be paired, a write access to the interface memory SRAM will be effected every two clock cycles. Access to a single address requires only one clock cycle. Thus, between two write access operations one clock cycle is available to access the interface memory SRAM for reading, in order to transfer the data read from the collective memory SDRAM to the units B. Thus, in principle, write access and read access to the interface memory SRAM can be effected alternately and one after another. The access to the interface memory SRAM will be described in greater detail hereinafter.

The interface memory SRAM is, in fact, divided into three zones Z1, Z2 and Z3. The zones Z1, Z2 and Z3 contain the data intended for the processors P1, P2 and P3, respectively. The data from the collective memory SDRAM is written into the zone Z1, Z2 or Z3 via the input buffer memory IB depending on the processor P from which the current macro-command originates. The data present in the zones Z1, Z2 and Z3 is transferred to the output buffer memories OB1, OB2 and OB3, respectively, in a substantially steady fashion and in accordance with a substantially fixed scheme. An output buffer memory OB in fact splits the data into a plurality of parts and applies the relevant data to the respective processor P part by part. For example, an output buffer memory OB can split 16 bit data into 4-bit parts. Thus, instead of transferring the data in a single clock cycle, which requires a 16-bit bus, the data is transferred part by part in 4 clock cycles, which requires only a 4-bit bus.

The control circuits CON1, CON2 and CON3 control the zones Z1, Z2 and Z3, respectively. For this purpose, each control circuit CON controls a group of parameters. These parameters include a write pointer, a read pointer and a zone occupancy value. The write pointer defines the address in which the data from the collective memory SDRAM is to be written. The read pointer defines the address of the data to be transferred to the relevant output buffer memory OB. The occupancy value indicates the number of addresses still available for the storage of the data received from the collective memory SDRAM. The control circuits CON1, CON2 and CON3 also control the output buffer memories OB1, OB2 and OB3, respectively. For this purpose, each control circuit CON controls a parameter representing the state of occupancy of the corresponding OB.

The control process carried out by a control circuit CON will now be described, assuming that the collective memory SDRAM is accessed as illustrated in FIG. 5. In the step S5 the macro-command addressing circuit AGB submits a macro-command to the buffer memory arrangement BUF. This macro-command is processed by the control circuit CON corresponding to the processor P from which the macro-command originates. The control circuit CON compares the number of data defined by the macro-command with the occupancy value. Thus, the control circuit CON verifies whether there is sufficient room in the relevant zone Z to store the desired data. If there is enough room, the control circuit CON reports this to the macro-command addressing circuit AGB and, moreover, updates the occupancy parameter. This means that it considers the data as already stored in the relevant zone while this should still be done. Therefore, the update of the occupancy parameter may be regarded as a reservation in the relevant zone.

What happens during the step S12 as shown in FIG. 5 will now be described. This step S12 represents a read-out of the collective memory SDRAM in accordance with the relevant macro-command. It has already been explained that at the instant at which the access interface SIF starts to process the macro-command and thus starts the read-out, the acknowledge signal associated with the relevant macro-command leaves the acknowledge signal buffer memory FIFO_ACK shown in FIG. 7. This acknowledge signal indicates that the access is a write operation and, moreover, this signal specifies the processor P from which the macro-command stems. Thus, the control circuit CON corresponding to this processor P knows that it should supply the addresses where the data should be stored in the collective memory SDRAM. Furthermore, the control circuit CON receives an indication of the number of data involved in the access operation in accordance with the macro-command, which indication forms part of the acknowledge signal.

Each time that a data pair from the collective memory SDRAM is written into the relevant zone Z the control circuit CON increments the write pointer. Moreover, it updates the occupancy value. The control circuit CON continues to do so until the read access to the collective memory SDRAM as defined by the macro-command has been completed. The control circuit CON detects the end of the access operation with the aid of the number of data involved in the access operation, this number being indicated by the acknowledge signal, and a by counting the data written into the interface memory SRAM.

After each read-out of a data pair from a given zone Z the control circuit CON which controls this zone increments the read pointer. Moreover, it updates the occupancy value.

The interface memory access arbiter ARBBR controls the access to the interface memory SRAM. There are different types of access: (1) access by the access interface SIF to write data from the collective memory SDRAM into the interface memory SRAM, (2) access operations by the output buffer memory OB1, (3) access operations by the output buffer memory OB2, and (4) access operations by the output buffer memory OB3. The three last-mentioned access operations serve to transfer data contained in the interface memory SRAM to the processors P1, P2 and P3, respectively.

Any access to the interface memory SRAM is effected in response to a request submitted to the interface memory access arbiter ARBBR. From the current requests the interface memory access arbiter ARBBR selects the request having the highest priority. The write access requests (access via the access interface SIF) having the maximal priority. As a result of the fact that pairs of data are written, as explained hereinbefore, such a request generally occurs only once every two clock cycles. A write operation requires only one clock cycle. Consequently, there will be enough opportunities to access the interface memory SRAM in the read mode in order to transfer the data to the various processors P.

The read access requests by a given output buffer memory OB are made depending on the size of the private read bus BBR between the output buffer memory OB and the unit B. It is assumed, for example, that the size of the bus is N/2 bits. This means that a N/2 bit part can be transferred from the output buffer memory OB to the unit B in every clock cycle. Reading of the interface memory SRAM is effected in pairs of data. One data pair comprises 2N bits. Therefore, 4 clock cycles are needed to send one data pair to the unit B. The transfer of one data pair involves a request for access to the interface memory SRAM in the read mode. Thus, in the present example, the OB will submit an access request every 4 clock cycles. This example shows that the sizes of the buses to the units B dictate the frequency of the access requests of the various output buffer memories OB. If the size of the private read bus BBR is N/4 bit there will be an access request every 8 clock cycles.

The following description relates to an example of arbitration for access to the interface memory SRAM. It is assumed that the size of the private read bus BBR1 is N/2 bits and that the size of the private read bus BBR2 and that of the private read bus BBR3 is N/4 bits. The access operations of the access interface SIF have the highest priority, followed, in order of priority, by the access operations of the output buffer memories OB1, OB2 and OB3. Finally, it is assumed that the requests for all the types of access (SIF, OB1, OB2, OB3) are submitted simultaneously in the first clock cycle.

Cycle 1: all the requests are made at the same time;
Pending requests: the access interface SIF, the output buffer memories OB1, OB2 and OB3.
Cycle 2: the interface access SIF having the highest priority has the lead and drops its request; the output buffer memories OB1, OB2 and OB3 maintain their requests;
Pending requests: the output buffer memories OB1, OB2 and OB3;
Cycle 3: the output buffer memory OB1, which has the second highest priority, has the lead and drops its request;
the access interface SIF submits a new request;
Pending requests: access interface SIF, the output buffer memories OB2 and OB3;
Cycle 4: the access interface SIF having the highest priority has the lead and drops its request; the output buffer memories OB2 and OB3 maintain their requests;
Pending requests: the output buffer memories OB2 and OB3;
Cycle 5: the output buffer memory OB2, which has the third highest priority, has the lead and drops its request; the access interface SIF submits a new request;
Pending requests: the access interface SIF and the output buffer memory OB3;
Cycle 6: the access interface SIF having the highest priority has the lead and drops its request; the output buffer memory OB1 is running out of buffer capacity and again submits a request;
Pending requests: the access interface SIF, the output buffer memories OB1 and OB3;
Cycle 7: the output buffer memory OB1, which has the second highest priority, has the lead and drops its request;
the access interface SIF submits a new request;
Pending requests: the access interface SIF, the output buffer memory OB3;
Cycle 8: the access interface SIF having the highest priority has the lead and drops its request; the output buffer memory OB3 maintains its request;
Pending request: output buffer memory OB3;
Cycle 9: the output buffer memory OB3, which has the fourth highest priority, has the lead and drops its request;
the access interface SIF submits a new request;
Pending request: the access interface SIF;
Cycle 10: the access interface SIF having the highest priority has the lead and drops its request; the output buffer memory OB1 is running out of buffer capacity and again submits a request;
Pending request: the output buffer memory OB1;
Cycle 11: the output buffer memory OB1, which has the second highest priority, has the lead and drops its request;
the access interface SIF submits a new request;
Pending request: the access interface SIF;
Cycle 12: the access interface SIF having the highest priority has the lead and drops its request; the output buffer memory OB2 is running out of buffer capacity and again submits a request;
Pending request: the output buffer memory OB2;
Cycle 13: the output buffer memory OB2 having the third highest priority has the lead and drops its request;
the access interface SIF submits a new request;
Pending request: the access interface SIF;
Cycle 14: the access interface SIF having the highest priority has the lead and drops its request; the output buffer memory OB1 is running out of buffer capacity and again submits a request;
Pending request: the output buffer memory OB1;
Cycle 15: the output buffer memory OB1 having the second highest priority has the lead and drops its request;
the access interface SIF submits a new request;
Pending request: the access interface SIF;
Cycle 16: the access interface SIF having the highest priority has the lead and drops its request; the output buffer memory OB3 is running out of buffer capacity and again submits a request;
Pending request: the output buffer memory OB3;
Cycle 17: the output buffer memory OB3 having the fourth highest priority has the lead and drops its request;
the access interface SIF submits a new request;
Pending request: the access interface SIF;
Cycle 18: the access interface SIF having the highest priority has the lead and drops its request; the output buffer memory OB I is running out of buffer capacity and again submits a request;
Pending request: the output buffer memory OB1;
Cycle 19: the output buffer memory OBI having the second highest priority has the lead and drops its request;
the access interface SIF submits a new request;
Pending request: the access interface SIF;
Cycle 20: the access interface SIF having the highest priority has the lead and drops its request;
the output buffer memory OB2 is running out of buffer capacity and again submits a request;
Pending request: the output buffer memory OB2;
Cycle 21: the output buffer memory OB2 having the third highest priority has the lead and drops its request;
the access interface SIF submits a new request;
Pending request: the access interface SIF;
Cycle 22: the access interface SIF having the highest priority has the lead and drops its request;

the output buffer memory OB1 is running out of buffer capacity and again submits a request;
Pending request: the output buffer memory OB1;
Cycle 23: the output buffer memory OB1 having the second highest priority has the lead and drops its request;
the access interface SIF submits a new request;
Pending request: the access interface SIF;
Cycle 24: the access interface SIF having the highest priority has the lead and drops its request;
the output buffer memory OB3 is running out of buffer capacity and again submits a request;
Pending request: the output buffer memory OB3;
Cycle 25: the output buffer memory OB3 having the fourth highest priority has the lead and drops its request;
the access interface SIF submits a new request;
Pending request: the access interface SIF;
Cycle 26: the access interface SIF having the highest priority has the lead and drops its request;
the output buffer memory OB1 is running out of buffer capacity and again submits a request;
Pending request: the output buffer memory OB1;
Etc.

The access operations described hereinbefore have a periodicity of 8 cycles. It is as though arbitration is effected by a cyclic machine having eight states. This is owing to the fact that in the example it is assumed that all the units B process their data in a regular fashion.

Moreover, it is assumed that the access requests by the access interface SIF are submitted regularly once every two clock cycles. In practice, these assumptions are not necessarily correct. For this reason, it is preferred to control the access to the interface memory SRAM with the aid of an arbiter and in an order of priority rather than with the aid of a cyclic machine. The arbiter allows a certain degree of flexibility as regards the access to the interface memory SRAM and, consequently, it allows a better utilization of the bandwidth available for the data transfer.

The following is an example of an exception to the rule in accordance with which there is only one write access to the interface memory SRAM (=access by the access interface SIF) every two clock cycles. This exception occurs in the case of an access to the collective memory SDRAM in response to a macro-command involving an odd number of data. All the data involved in this access, except for the last data element, have a partner and thus form pairs to be written into the interface memory SRAM. The last data element is alone. It is not possible to use the next data element to form a pair because this data element is the first data element of another access operation and is therefore intended for another processor P. As a result, this first data element of another access operation should be stored in another zone Z of the interface memory SRAM. Thus, upon the arrival in the input buffer memory IB of the last data element of the access involving an odd number of data elements said data is loaded into the interface memory SRAM without a partner in the clock cycle that follows the write operation for the last data pair comprised in the access operation. Consequently, there will be two write access operations in succession without a break of one clock cycle, which would otherwise allow a read access operation between two write access operations.

FIGS. 5 and 9 relate to the operation of the memory interface INT in the read mode. The operation in the write mode is substantially symmetrical. This means that the write buffer memory arrangement BUFW is similar to the read buffer memory arrangement BUFR described hereinbefore. Thus, the write buffer memory arrangement BUFW comprises an interface memory divided into zones, each zone being associated with a different unit B. The units B can supply data to be written into the collective memory before or after the macro-command which indicates where this data should be stored. In fact, a zone will be filled as soon as the unit B to which the zone corresponds supplies data to be stored in the collective memory. Said filling may continue, for example, until the zone is completely filled with data. In this case the memory interface INT will indicate to the relevant unit B that there is no longer any room for the storage of new data. This will prevent the unit B from supplying new data until room has become available in the relevant zone. A data transfer from the zone Z to the collective memory results in room being made available. Such a data transfer can occur as soon as a macro-command is accepted by the arbiter ARB and is processed by the access interface SIF. It is likewise possible that a macro-command is issued before the relevant unit B has supplied the data. In any case, no macro-command will be applied to the arbiter ARB as long as the write buffer memory arrangement BUFW does not indicate an adequate filling level of the relevant zone.

The data processing arrangement described hereinbefore with reference to FIGS. 1–9 is an example of an implementation of the invention as outlined in the part titled "summary of the invention". Referring to FIG. 1, the private read bus BBR1 and the private write bus BBW1 enable data communication exclusively between the unit B1 and the collective memory SDRAM. The private read bus BBR2 and the private write bus BBW2 enable data communication exclusively between the unit B2 and the collective memory SDRAM. The private read bus BBR3 and the private write bus BBW3 enable data communication exclusively between the unit B3 and the collective memory SDRAM. The memory interface INT allows each unit B to access the collective memory in data bursts while it produces substantially steady data streams on the private read and write buses BBR, BBW. In effect, for each unit B, the memory interface INT performs a smoothing of the data bursts read from the collective memory SDRAM and intended for the unit B. Conversely, for each unit B, the memory interface INT performs a time concentration of the data received from the unit B in order to write data into the collective memory SDRAM in bursts.

The drawings and their description hereinbefore illustrate rather than limit the invention. It will be evident that there are numerous alternatives, which fall within the scope of the appended claims. In this respect, the following closing remarks are made.

There are various manners to implement a data processing arrangement in accordance with the invention. The data processing arrangement illustrated in FIG. 1 comprises three processors. Other implementations may comprise more processors or fewer processors. Moreover, it is not necessary that each processor has a private bus. Some processors may share a common bus via which they can access the collective memory. For example, the data processing arrangement illustrated in FIG. 1 may comprise two or more additional processors, not shown, that share a common bus via which they can access the collective memory SDRAM or another collective memory.

There are various manners to implement private buses. The data processing arrangement illustrated in FIG. 1 comprises private read buses BBR and private write buses BBW. Other implementations may comprise private bi-directional buses. In such an implementation, a processor can both read data from the collective memory and write data into a collective memory via a private bi-directional bus. Such a bi-directional bus will carry a substantially steady read data stream and a substantially steady write data stream, the two streams being interleaved.

There are various manners to implement a memory interface. The memory interface illustrated in FIG. 4 provides access to the collective memory on the basis of arbitration. Other implementations may provide access to a collective memory on the basis of a fixed scheme. The fixed scheme may be a repetitive access pattern that comprises at least one time slot for each processor.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

For example, FIG. 4 illustrates a memory interface comprising various blocks which, in combination, control the access to the collective memory and control memory circuits included in the memory interface. In principle, it is possible to implement these blocks by means of a suitable programmed computer circuit. A set of instructions loaded into a program memory causes the computer circuit to effect the various control operations described with reference to FIGS. 1–9. The set of instructions may be loaded into the program memory by reading a carrier, such as, for example, a disk, which contains the set of instructions. The reading of the carrier may be effected via a communication network, such as, for example, the Internet. That is, a service provider may make the set of instructions available via a communication network.

Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps.

What is claimed is:

1. A data processing arrangement comprising a plurality of processors arranged to cooperate with a collective memory, wherein the data processing arrangement comprises:

a plurality of private buses, each private bus enabling data communication exclusively between one of the plurality of processors and the collective memory; and a memory interface for providing access to the collective memory in data bursts while it produces substantially steady data streams on the private buses.

2. A data processing arrangement as claimed in claim 1, wherein the memory interface comprises:

a collective buffer memory; and a control device for controlling zones in the collective memory, wherein each zone is associated with a different one of the plurality of processors.

3. A data processing arrangement as claimed in claim 2, wherein the memory interface comprises an arbiter for controlling the access to the collective buffer memory.

4. A method of data processing by means of a plurality of processors arranged to cooperate with a collective memory via private buses, each private bus enabling data communication exclusively between one of the plurality of processors and the collective memory; the method comprising the step of:

providing access to the collective memory in data bursts while substantially steady data streams are produced on the private buses.

5. A computer program product for a data processing arrangement comprising a plurality of processors arranged to cooperate with a collective memory via a memory interface and private buses, the computer program product comprising a set of instructions which, when loaded into the data processing arrangement, causes the memory interface to provide access to the collective memory in data bursts while substantially steady data streams are produced on the private buses.

\* \* \* \* \*